United States Patent Office 3,015,569
Patented Jan. 2, 1962

---

3,015,569
TREATMENT OF PIGMENTS
Rudolf G. Frieser, Long Island City, N.Y., assignor to Interchemical Corporation, New York, N.Y., a corporation of Ohio
No Drawing. Filed Nov. 26, 1958, Ser. No. 776,434
8 Claims. (Cl. 106—26)

This invention relates to the art of treating pigments, and has as its object the provision of inks that are fluid and thin in body and include finely ground pigments which have been treated according to the method of the invention and then dispersed in a volatile organic solvent solution of nitrocellulose, and alcohol soluble resins.

It is known that finely ground pigments can be dispersed in a volatile organic solvent solution of nitrocellulose and alcohol soluble resins to obtain fluid inks that are thin in body.

It is further known that difficulties are encountered with dispersions of certain pigments in the aforementioned vehicle.

One difficulty with such dispersions, particularly those concentrated dispersions where the ratio of pigment to non pigment is high, is the tendency of the dispersion to be characterized by plastic flow. The physicist describes such dispersions as being flocculated and such dispersions will not flow until the deforming force is greater than a certain minimum called yield value. Once the force exceeds the yield value, flow takes place as the deforming force increases.

Another difficulty is that these dispersions possess in addition to yield value, the characteristics of thixotropy. Thixotropic materials, by definition, become less viscous with agitation, but return to original viscosity upon standing. This behavior is a consequence of the breakdown and buildup of the structure of the material.

We have found that the aforementioned difficulties are largely overcome and fluid inks of thin body obtained by treating these pigments with an amino-alkoxysilane prior to dispersion in a volatile organic solvent solution of nitrocellulose and alcohol soluble resins. This treatment works with the pigments consisting of the alkaline earth metal derivatives of hydroxylated, sulfonated, azo naphthalenes, especially those obtained by coupling diazotized naphthylamines with naphthols wherein either the naphthylamine or the naphthol has a sulfonic acid substituent. The treatment works especially well with the pigments consisting of the calcium derivatives of hydroxylated, sulfonated, azo naphthalenes. The treatment results in less spectacular improvements in the flow properties of the barium derivatives; but it is believed this is due to the fact that the untreated barium derivatives have better flow properties to begin with.

In treating the pigment not less than 2 parts of an amino alkoxy silane are used per 100 parts of pigment. The use of 5 parts of an amino alkoxy silane per 100 parts of pigment is preferred. Gamma amino propyl triethoxy silane is preferred as the treating agent.

More specifically, the method of treating these pigments is illustrated by the following examples which are intended to be illustrative only, and not in limitation of the invention.

Example 1

100 grams of Uncas Maroon (a commercial material which consists essentially of the calcium derivative of the azo compound from alpha-naphthylamine and 1-naphthol-5-sulfonic acid) was slurried in 500 ml. of water. 5 grams of gamma-amino-propyltriethoxy-silane was then added and mixing continued for about 20 minutes. The slurry was then transferred to a pan and dried in a forced draft oven overnight at 60° C.

Example 2

100 grams of Calcium Lithol (a commercial material which consists essentially of the calcium derivative of the azo compound from 2-naphthol and beta-naphthylamine-8-sulfonic acid) was pasted with 500 ml. of water by means of an Eppenbach stirrer for about 20 minutes. 5 grams of gamma-aminopropyltriethoxy silane was then added and mixing continued for about 20 minutes. The paste was then dried in an oven overnight at 60° C.

Example 3

200 grams of Barium Lithol (a commercial material which consists essentially of the barium derivative of the azo compound from 2-naphthol and beta-naphthylamine-8-sulfonic acid) was slurried in 1000 ml. of water by means of an Eppenbach stirrer for about 20 minutes, making sure that the pigment was well dispersed. 10 grams of gamma-aminopropyltriethoxy silane was then added and stirring continued for 20 minutes. The slurry was then dried in a flat pan in an oven at 60° C.

The separation of the treated pigment from aqueous slurry or paste can be brought about by other conventional methods. For example, the aqueous slurry can be filtered on a filter press; the press cake washed with water; and the press cake put in an oven and dried.

In formulations of the aforementioned inks, the pigments are best dispersed by means of ball milling and at pigment concentrations of 15% to 25%. When the untreated pigment is dispersed at these concentrations, however, the ink system tends to be characterized by plastic flow, high yield value, and pronounced viscosity buildup on standing. In fact, this viscosity buildup is so great in the case of untreated Uncas Maroon that it becomes impossible to pour the ink system from the mill.

A quite different result is attained, however, when these pigments are treated according to the method of this invention prior to dispersion by means of ball milling into the ink system.

More specifically, an ink base was made by placing 25.0 grams of the treated pigment from Example 1 in a ball mill and adding thereto a solution of 8.7 grams of R.S. grade nitrocellulose (30–35 centipoises) in a solvent made up of 5.0 grams of ethyl acetate and 61.3 grams of ethanol. (R.S. grade nitrocellulose has a nitrogen content of 11.8–12.2%.) (The viscosity of the nitrocellulose was determined by the Hercules falling ball method on a 12.2% solution in a solvent consisting of 25 parts by weight of ethanol, 20 parts by weight of ethyl acetate and 55 parts by weight of toluol.) After ball milling for about 16 hours, the resulting base was easily poured from the mill.

To prepare the finished ink, a solution of 14.7 grams of Bleached Bone Dry Shellac dissolved in 25.3 grams of ethanol was added to 60 grams of the above ink base. The resulting maroon colored ink had a low yield value, and showed little tendency toward viscosity buildup on standing. In fact, the yield value of this ink was about 10 times less than the yield value of the same ink with the untreated pigment of Example 1 incorporated therein rather than the treated pigment. Furthermore, the ink with the untreated pigment became very viscous on standing, and therefore, did not meet the requirements of fluidity and thinness of body.

Obviously, modification of the specific disclosure can be made without departing from the scope of the invention as defined in the following claims.

What is claimed is:

1. A method of treating a pigment taken from the group of pigments consisting of the alkaline earth metal derivatives of hydroxylated, sulfonated, azo naphthalenes in order to lower the yield value and decrease the thixotropy of a dispersion of the pigment in a volatile organic solvent solution of nitrocellulose and alcohol soluble resins including the steps of (1) preparing an aqueous slurry of the pigment, and (2) adding 2 to 5 parts of an aminopropyl alkoxy silane per 100 parts of pigment to the aqueous slurry.

2. The method according to claim 1 wherein 5 parts of gamma-aminopropyltriethoxy silane is added to an aqueous slurry of 100 parts of pigment.

3. The method according to claim 1 wherein the pigment is taken from the group of pigments consisting of the calcium derivatives of hydroxylated, sulfonated, azo naphthalenes.

4. The method according to claim 1 wherein the pigment is a commercial material which consists essentially of the calcium derivative of the azo compound from alpha-naphthylamine and 1-naphthol-5-sulfonic acid.

5. A treated pigment taken from the group of pigments consisting of the alkaline earth metal derivatives of hydroxylated, sulfonated, azo naphthalenes which has been treated in aqueous slurry with 2 to 5 parts of an aminopropyl alkoxy silane per 100 parts of pigment.

6. A treated pigment taken from the group of pigments consisting of the calcium derivatives of hydroxylated, sulfonated, azo naphthalenes which has been treated in aqueous slurry with 2 to 5 parts of an aminopropyl alkoxy silane per 100 parts of pigment.

7. Printing inks that are fluid and thin in body and comprising a dispersion of a finely ground treated pigment in a volatile organic solvent solution of nitrocellulose and alcohol soluble resins, where said finely ground treated pigment is a pigment taken from the group consisting of alkaline earth metal derivatives of hydroxylated, sulfonated, azo naphthalenes which has been treated in aqueous slurry with 2 to 5 parts of an aminopropyl alkoxy silane per 100 parts of pigment.

8. Printing inks that are fluid and thin in body and comprising a dispersion of a finely ground treated pigment in a volatile organic solvent solution of nitrocellulose and alcohol soluble resins, where said finely ground treated pigment is a pigment taken from the group of pigments consisting of the calcium derivatives of hydroxylated, sulfonated, azo naphthalenes which has been treated in aqueous slurry with 2 to 5 parts of an aminopropyl alkoxy silane per 100 parts of pigment.

References Cited in the file of this patent

UNITED STATES PATENTS

| | | |
|---|---|---|
| 2,192,955 | Sloan et al. | Mar. 12, 1940 |
| 2,683,702 | Eastes et al. | July 13, 1954 |
| 2,717,246 | Kienle et al. | Sept. 6, 1955 |
| 2,820,710 | Buckwalter et al. | Jan. 21, 1958 |
| 2,832,754 | Jex | Apr. 29, 1958 |

OTHER REFERENCES

Union Carbide and Carbon, "Organo Functional Silanes" (1956), U.C. & C. Corp., New York, N.Y. (pages 9, 10 and 16).

Ellis: "Printing Inks," pub. 1940 by Reinhold, New York, N.Y. (pages 163 and 234–5).